(12) United States Patent
Brown

(10) Patent No.: US 7,051,853 B2
(45) Date of Patent: May 30, 2006

(54) CONVERTIBLE LUGGAGE DEVICE

(75) Inventor: Deborah Brown, 427 W. Dakota Ave., Nampa, ID (US) 83686

(73) Assignee: Deborah Brown, Nampa, ID (US)

( * ) Notice: Subject to any disclaimer, the term of this patent is extended or adjusted under 35 U.S.C. 154(b) by 0 days.

(21) Appl. No.: 10/770,084

(22) Filed: Jan. 30, 2004

(65) Prior Publication Data
US 2005/0110231 A1 May 26, 2005

Related U.S. Application Data

(63) Continuation-in-part of application No. 09/839,900, filed on Apr. 20, 2001, now abandoned.

(51) Int. Cl.
*A45C 5/14* (2006.01)
(52) U.S. Cl. .............. 190/18 A; 190/1; 190/8; 190/115; 280/37; 280/47.26
(58) Field of Classification Search ............. 190/1, 190/8, 15.1, 18 A, 39, 115; 280/37, 43.17, 280/47.18, 47.38, 47.24, 47.26, 47.34, 655, 280/655.1
See application file for complete search history.

(56) References Cited

U.S. PATENT DOCUMENTS

| | | | | | |
|---|---|---|---|---|---|
| 504,817 | A | * | 9/1893 | Plouf | 280/38 |
| 854,602 | A | * | 5/1907 | Peterson | 280/43.1 |
| 1,125,441 | A | * | 1/1915 | Bailey | 280/37 |
| 2,510,754 | A | * | 6/1950 | Norlin | 280/38 |
| 2,577,951 | A | * | 12/1951 | Cortsen | 280/37 |
| 2,581,417 | A | * | 1/1952 | Jones | 280/645 |
| 3,376,954 | A | * | 4/1968 | Neptune | 188/69 |
| 3,809,202 | A | * | 5/1974 | Tyszkiewicz | 194/247 |
| 3,960,252 | A | * | 6/1976 | Cassimally | 190/18 A |
| 4,273,222 | A | * | 6/1981 | Cassimally et al. | 190/18 A |
| 4,412,689 | A | * | 11/1983 | Lee | 280/648 |
| 4,524,482 | A | * | 6/1985 | Mueller | 16/44 |
| 4,550,813 | A | * | 11/1985 | Browning | 190/18 A |
| 4,750,783 | A | | 6/1988 | Irby et al. | 297/250 |
| 4,771,871 | A | * | 9/1988 | Lambracht | 190/1 |
| 4,795,186 | A | * | 1/1989 | Tyus | 280/651 |
| 4,802,681 | A | | 2/1989 | Hung | 280/47.18 |
| 4,902,026 | A | | 2/1990 | Maldonado | 280/30 |
| 4,946,180 | A | | 8/1990 | Baer | 280/39 |
| 5,114,164 | A | | 5/1992 | Bothwell et al. | 280/37 |
| 5,147,019 | A | * | 9/1992 | Van Hooreweder et al. | 190/18 A |
| 5,154,265 | A | * | 10/1992 | Capistrant | 190/18 A |
| 5,313,817 | A | | 5/1994 | Meinders | 62/452.1 |
| 5,343,988 | A | * | 9/1994 | Bartsch et al. | 170/18 A |
| 5,370,408 | A | | 12/1994 | Eagan | 280/642 X |
| 5,407,039 | A | * | 4/1995 | Alper et al. | 190/18 A |
| 5,474,311 | A | | 12/1995 | Tyciak et al. | 280/30 |
| 5,758,752 | A | * | 6/1998 | King et al. | 190/18 A |

(Continued)

FOREIGN PATENT DOCUMENTS

EP 0 480 371 A1 4/1992 ............... 286/647

(Continued)

*Primary Examiner*—Sue A. Weaver
(74) *Attorney, Agent, or Firm*—Fulwilder Patton LLP

(57) ABSTRACT

A convertible luggage device including a retractable handle assembly and at least one pair of extendable wheels. Included is a brake system operating to lock at least one of the wheels. In one aspect, the device forms a stroller. In another aspect, the device includes straps for engaging a car seat or a basket for receiving luggage or other items. By embodying a broad wheel base, the present invention provides a stable platform for pushing or pulling luggage or for performing as a stroller.

20 Claims, 4 Drawing Sheets

U.S. PATENT DOCUMENTS

| | | | | |
|---|---|---|---|---|
| 5,778,488 A * | 7/1998 | Tsai | ............................... | 16/34 |
| 5,879,022 A | 3/1999 | Winton | ....................... | 280/655 |
| 5,957,349 A * | 9/1999 | Krulik | ........................ | 224/155 |
| 5,971,409 A | 10/1999 | Butz | ....................... | 280/47.26 |
| 5,988,657 A * | 11/1999 | Henkel | .................... | 280/47.25 |
| 6,193,033 B1 * | 2/2001 | Sadow et al. | ............. | 190/18 A |
| 6,220,621 B1 | 4/2001 | Newton | ....................... | 280/650 |
| 6,241,313 B1 * | 6/2001 | Lenz et al. | .............. | 297/217.1 |
| 6,769,701 B1 * | 8/2004 | Clausen | ...................... | 280/37 |

FOREIGN PATENT DOCUMENTS

| | | | | | |
|---|---|---|---|---|---|
| FR | 2598897 A1 | * | 11/1987 | | |
| GB | 2124589 A | * | 2/1984 | | |
| GB | 2168035 A | * | 6/1986 | | |
| GB | 2245543 A | * | 1/1992 | | |
| JP | 3-128762 | | 5/1991 | ................. | 280/647 |
| JP | 3-186474 | | 8/1991 | ................. | 280/550 |
| WO | WO92/14638 | * | 9/1992 | | |

* cited by examiner

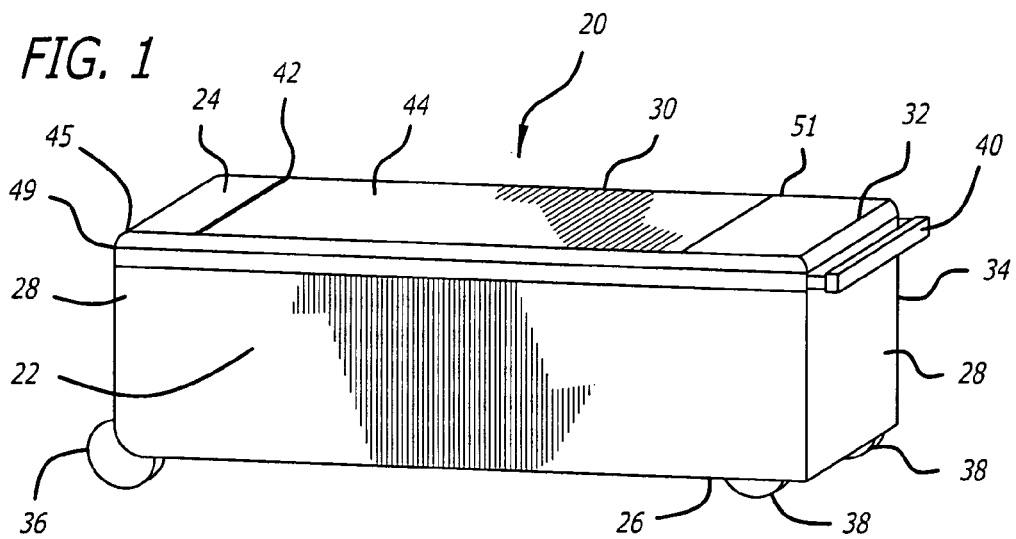
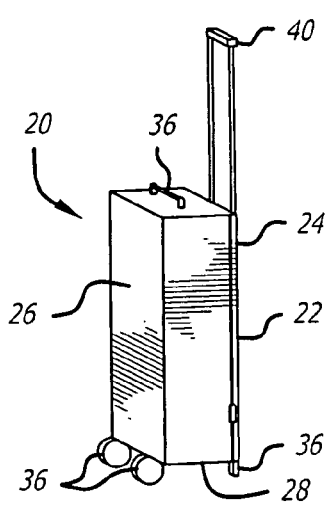
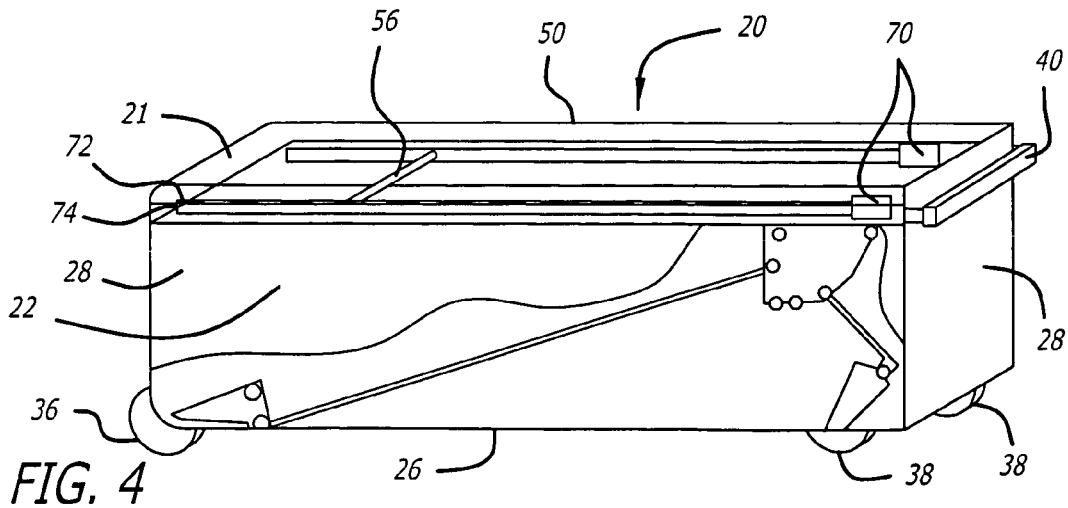

CONVERTIBLE LUGGAGE DEVICE

This application is a continuation-in-part of U.S. application Ser. No. 09/839,900, filed Apr. 20, 2001 now abandoned, the contents of which are incorporated by reference.

BACKGROUND OF THE INVENTION

Field of the Invention

The present invention relates generally to convertible luggage devices and more particularly to luggage devices that can be alternatively pushed or pulled and which provide structure that is multi-functional.

Convenience is an important consideration in luggage choice. Families who travel with small children often bring strollers, car seats, diaper bags, carry-on bags and a host of other items. Those traveling without children also must contend with transporting a number of items.

Prior luggage devices have been developed with wheels so that the luggage can be rolled rather than continuously carried. Luggage including two or four wheels have previously been produced. While such luggage can conceivably be pushed, most devices are designed to be pulled behind the traveler.

Luggage having convertible aspects have also been developed. Such luggage includes pivoting structure and complimentary structures that can be used as a sitting stool or as a baby stroller. Conventional luggage devices with convertible aspects have also been configured to be pushed rather than pulled behind a traveler.

However, prior devices can lack sufficient convenience for an individual to make it a luggage choice. For example, a number of conventional luggage devices are not equipped with a stable wheel base. The devices easily tip over in response to a lateral force. Other luggage devices lack structure for easy conversion into a stroller or push cart. That is, the conventional devices require several steps to transform, fold or unfold the various structures of the device. Still other conventional luggage devices lack necessary safety features to make them a luggage choice.

What is needed and heretofore unavailable is a convertible luggage device that incorporates basic travel needs into a single component that is easy to push, fold, store and stack. What is also needed is a luggage device that is convertible to thereby provide multiple carrying functions. The present invention satisfies these and other needs.

INVENTION SUMMARY

Briefly and in general terms, the present invention is directed towards a luggage device that is convenient to use. In one aspect, the luggage device of the present invention is convertible from a hand carried storage device to a rolling piece of luggage.

In another aspect, the luggage device of the present invention includes a pivoting handle and extendable wheels. In one preferred embodiment, the storage area of the luggage device has a generally horizontal profile and a relatively long wheel base that provides stability during transport.

The luggage device of the present invention can be equipped with stroller components. The stroller components are retractable to a position adjacent a long side of the storage compartment. In its unfolded configuration, the stroller components define a seat for a child and further include safety straps for holding the child in the seat. A braking assembly is provided to insure that the luggage device does not roll until after conversion into a stroller and upon a positive step being taken to deactivate the brake.

In yet another aspect, the present invention includes structures for accomplishing the automatic extension and retraction of the wheels. To wit, it is contemplated that the pivoting handle of the luggage device cooperates with lever mechanisms to set a desired position of certain of the wheels of the device.

In other preferred embodiments, the stroller components can be lacking or can be removed from the luggage device. The present invention can further include a strapping system for receiving a child car safety seat. Alternatively, the device can be equipped with a foldable basket designed to receive other luggage or travel items.

The convertible luggage device of the present invention also embodies a profile well suited for stacking when placed in its folded configuration as well as zipper accessible compartments for storing convertible portions of the device. Additionally, resting of one luggage device upon another allows for transporting a plurality of devices.

These and other objects and advantages of the invention will become apparent from the following more detailed description, when taken in conjunction with the accompanying drawings of illustrative embodiments.

BRIEF DESCRIPTION OF THE DRAWINGS

FIG. 1 is a perspective view, depicting a convertible luggage device of the present invention;

FIG. 2 is a perspective view, depicting the luggage device shown in FIG. 1 with a handle assembly in a projected position;

FIG. 3 is a perspective view, depicting the luggage device of FIG. 2 in tilted for pulling or pushing on wheels;

FIG. 4 is a cutaway view, depicting convertible structures of the luggage device of the present invention in a retracted position;

DETAILED DESCRIPTION OF THE PREFERRED EMBODIMENTS

Figure 5:
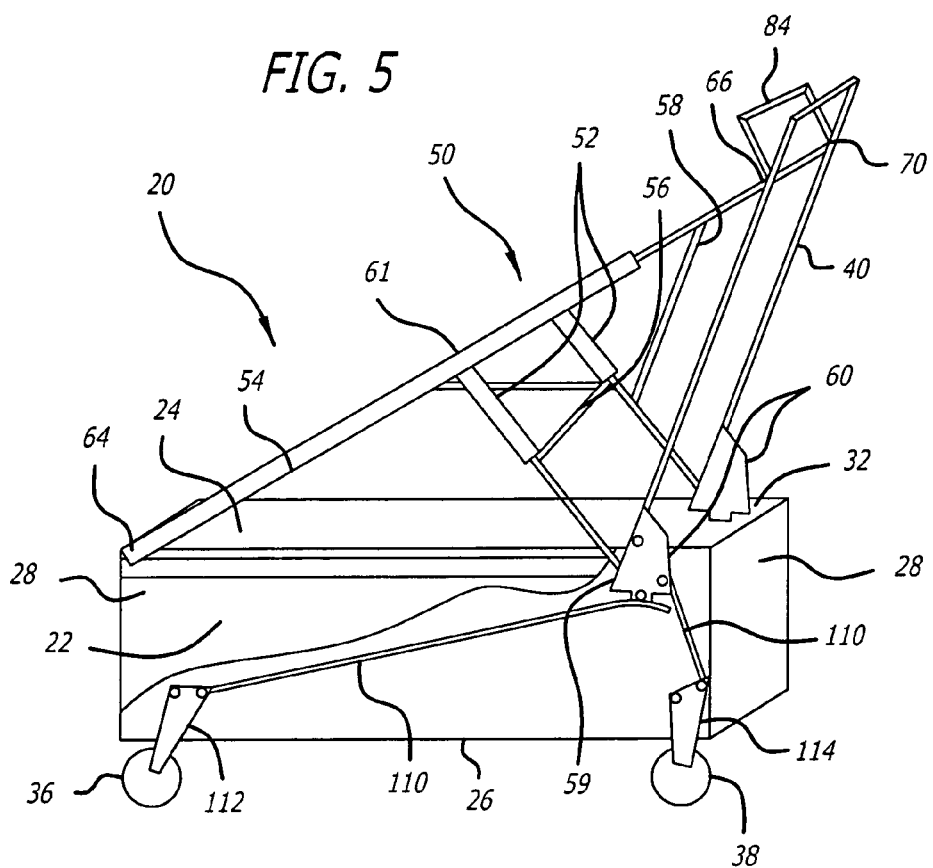
FIG. 5 is a cutaway view, depicting convertible structures of the luggage device shown in FIG. 4 in a deployed position.

As shown in the drawings, which are included for purposes of illustration and not by way of limitation, the present invention is embodied in a convertible luggage device that has structures providing multi-functionality. Referring to FIG. 1, the luggage device 20 of the present invention includes a body or container portion 22 having a top 24, a bottom 26 and a plurality of sidewalls 28. Although the luggage device is shown as having a generally rectangular box configuration in its fully retracted form, various other shapes are possible. To wit, it is contemplated that for a particular purpose, the luggage device can, for example, lack well-defined sidewalls 28. In the embodiment shown in the figures, the luggage device 20 has a long dimension 30 and two shorter dimensions 32, 34 to thereby define the rectangular box shape. As such, the luggage device 20 has a horizontal or low profile when placed so that the long dimension 30 is touching or parallel to the ground.

The luggage device 20 further includes a first pair of wheels 36 and a second pair of wheels 38 each of which project or are projectable from the bottom 26 of the luggage device 20. It is contemplated that in a preferred embodiment, the pairs of wheels be spaced sufficiently to provide the luggage device 20 with a broad wheel base, thus making the device highly stable. The device 20 further includes a retractable handle assembly 40, the details of which are provided below.

The luggage device 20 additionally includes a plurality of zippers providing access to various compartments of the luggage device 20. A first zipper 42 is configured in a top lid 44 of the luggage device 20 and provides access to a pocket or storage compartment in the top lid 44. A second zipper 45 provides a means for removing or opening the top lid 44 to gain access to for example, convertible structures stored therein. A third zipper 49 provides access to an interior compartment of the body or main portion 22 of the luggage device 20. The interior compartment can be used for transporting travel items. Finally, a fourth zipper 51 provides access to the interior compartment when the luggage device 20 has been converted to a deployed configuration.

As shown in FIGS. 2 and 3, the luggage device 20 can be placed generally vertically on a sidewall 28 and the handle assembly 40 can be placed in an extended position. When tilted onto the first pair of wheels 36, the device 20 can be pushed or pulled as desired by applying a force to the handle assembly 40. In order to provide stability when placed in a vertical position, the luggage device 20 can include a support or pair of spaced supports 46 which extend approximately the same distance from the sidewall 28 as the first pair of wheels 36. The second pair of wheels 38 are shown in a retracted position. The device can further be equipped with a grasping structure 48 attached to another of the sidewalls 28 located proximate the handle assembly 40. The grasping structure 48 allows a traveler to carry the luggage device 20 when convenient.

Turning now to FIGS. 4 and 5, one embodiment of the convertible structure 50 of the luggage device 20 of the present invention is shown. In a retracted form (FIG. 4), the convertible structure is folded against the body portion 22. When expanded (FIG. 5), the convertible structure defines a basket, a platform for a car seat, or a stroller seat.

In one aspect, the convertible structure 50 projects from the top side 24 of the luggage device 20. As stated, access to the convertible structure 50 may be accomplished by unzipping the top lid 44. The convertible structure 50 includes a pair of spaced folding diagonal supports 52 that engage spaced telescoping support tubes 54. Moreover, the convertible structure includes a horizontal seating support bar 56 and at least a pair of angled seating supports 58, each of which are connected to midsection portions of one or more of the folding diagonal support 52 or telescoping support tubes 54 to thereby define a seat or a receiving element for a car seat. A web spanning these members and safety straps are further provided, such structures being removable as desired.

As shown in the drawing figures, in a deployed configuration, the telescoping support tubes 54 and the handle 40 define a support triangle with the top 24 of the luggage device 20. Bisecting that triangular support are the folding diagonal supports 52, one end 59 of each of which is operatively associated with a first bracket 60 and a second end 61 engages a midsection portion of the telescoping support tube 54. A first end 64 of each of the telescoping support tubes is pivotably mounted to the top 24 of the body 22 of the luggage device, whereas a second end 60 of each of which engages the handle assembly 40.

In one preferred embodiment, the second end 60 of the telescoping support tubes include a locking hinge collar 70 which operates to lock the handle 40 in a generally upright or deployed position (FIG. 5). A terminal end 72 of the handle assembly can be configured within a guide (not shown) or can be free floating and can further include a brake lock 74. Where the device 20 includes a guide, the terminal end 72 of the handle assembly 40 can be slid transversely in a controlled manner when being deployed. When a guide is not provided, control during deployment is provided by the interconnection and cooperation of the handle 40, telescoping tubes 54, folding diagonal support 52 and first bracket 60.

Figure 6:
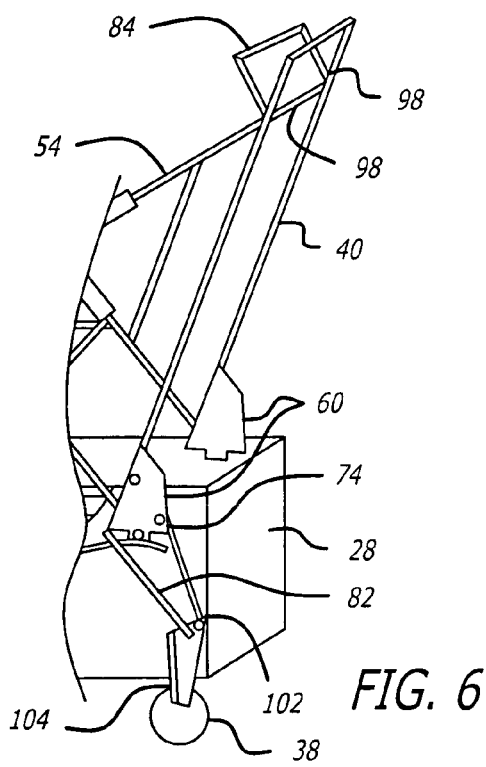
FIG. 6 is a partial view, depicting a handle and brake assembly of a luggage device of the present invention.
Figure 7:
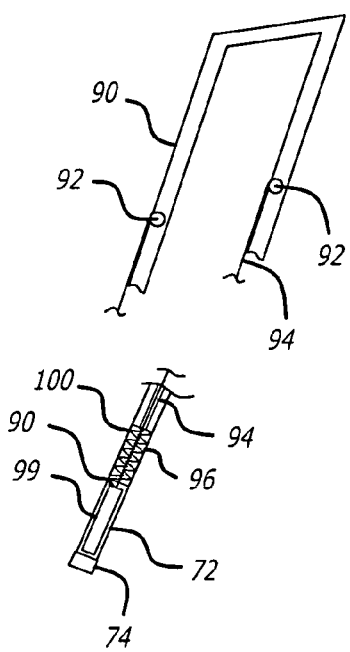
FIG. 7 is an enlarged cutaway view, depicting aspects of the handle and brake assembly shown in FIG. 6.

With reference to FIGS. 5–7, the handle assembly 40 and brake and wheel ejection system is described in more detail. After gaining access to the handle assembly 40, one simple tugging or pulling motion accomplishes the deployment of the convertible portion and wheels 36, 38 of the luggage device 20. The handle assembly 40 is held in a generally vertical position by the locking action of the hinge collars 70 and the engagement of the brake lock 74 against a braking lever assembly 82. When the luggage device 20 is so configured, a brake handle 84 pivotably attached to the handle assembly 40 is in an open position as demonstrated by diverging juxta-positioning of the two members and the second pair of wheels 38 are locked.

In a preferred embodiment, the handle assembly further includes a tubular handle portion 90, a pair of pulleys 92, and a pair of cables 94 each of which are fixed to one pulley 92. The cables 94 are separately routed through the tubular handle portions 90 and into engagement with the brake lock 74 attached to the terminal end 72 of the handle assembly 40. The brake lock 74 further includes a piston 99 and a biasing spring 100, the piston 99 being translatable within the tubular portion 90 and the spring 100 being fixed therewithin. Opposing ends 98 of the brake handle 84 can be configured to engage the pulleys 92 so that an action which causes the brake handle 84 to converge with the handle assembly 40, in turn causes the brake 82 to disengage the wheels 38.

In one aspect, the brake lever assembly 82 includes a first elongate rotation component 102 that is configured to engage a second elongate transmission component 104 which applies a direct force upon the wheels 38. It is to be recognized that there may be a separate braking system for each of the second pair of wheels 38 or alternatively, only one such system can be provided for a particular application. In any case, when the handle assembly 40 is fully deployed, the brake lock assembly 74 is placed against the first rotatable component 102 which forces the second translatable component 104 against a wheel 38. Compression of the brake handle 84 against he handle assembly 40 causes the pulleys 92 to rotate and the piston 99 to withdraw. This action operatively causes the second translatable component 104 to be removed from the wheel 38, thereby unlocking the same.

Additionally, when the handle is in its deployed state, the wheels are automatically extended from the bottom 26 of the luggage device. Pulling on the handle assembly 40 causes the first pair of brackets 60 to rotate. Through pivoting lever 110 connections to second and third pairs of rotatable brackets 112, 114, the wheels 36, 38 are caused to project from the luggage device 20. Although the figures depict a luggage device 20 having four retractable/projectable wheels 36, 38, it is also contemplated that only the second pair of wheels be retractable/projectable. Through conventional techniques, the wheels are locked in both the retracted and projected positions.

In a preferred embodiment, the luggage device is designed to be pushed when all four wheels 36, 38 are in an extended or projected position. It is to be recognized, however, that for particular applications, the luggage device 20 can be configured to be pushed or pulled as desired.

The luggage device 20 of the present invention is contemplated to be manufactured from light weight materials. The chassis, including the handles, levers and supporting members can be made from an aluminum and fiberglass composite. The luggage exterior can embody conventional fabrics or a hard shell of plastic or aluminum. The overall dimensions of the luggage device can be selected as desired, while sizes compliant with airline requirements is preferable.

Figure 8:
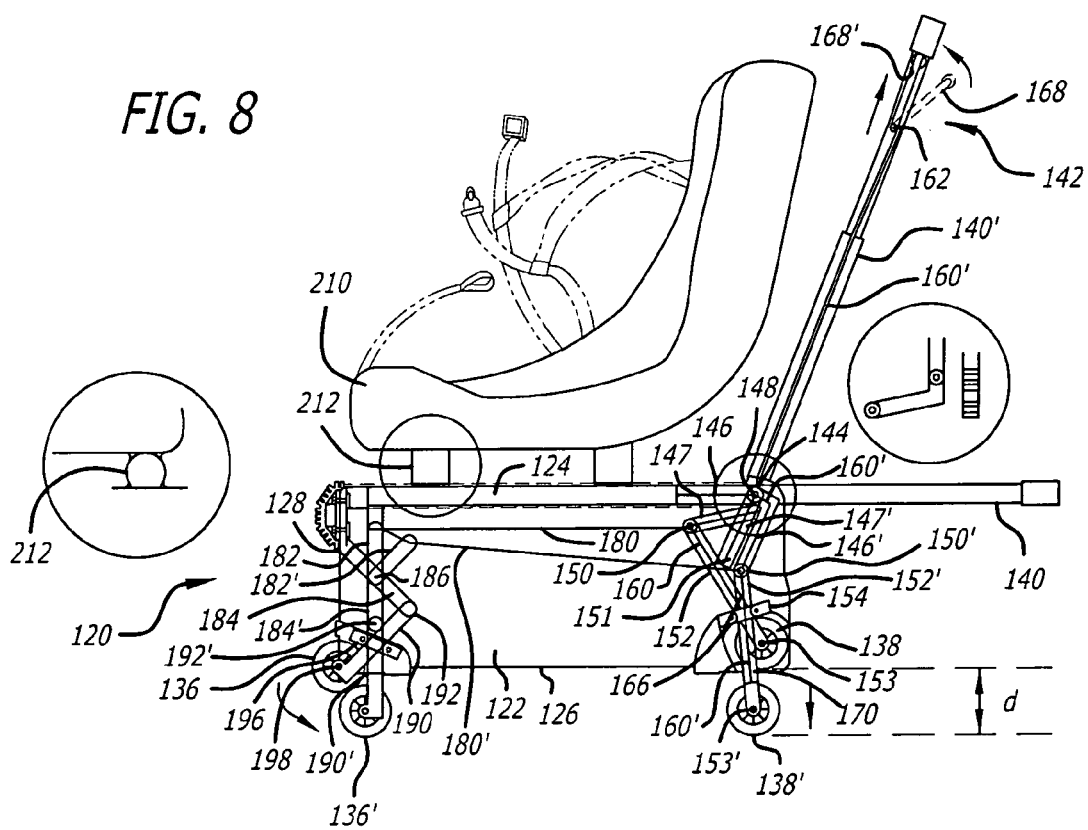
FIG. 8 is a side view, depicting details of wheel ejection and braking systems.

In one specific embodiment and with reference to FIG. 8, there is shown a luggage device 120 including a body or container portion 122 having a top 124, a bottom 126 and a plurality of sidewalls 128. The luggage device 120 further includes a first pair of wheels 136 and a second pair of wheels 138 each of which project or are projectable from the bottom 126 of the luggage device 120. It is to be understood that FIG. 8 depicts only one wheel of the pairs of wheels 136, 138 and likewise, one set of two separate structures connected thereto for ejecting and retracting the wheels. The device 120 further includes a retractable handle assembly 140.

After gaining access to the handle assembly 140, one simple tugging or pulling motion accomplishes the deployment of the convertible portion and wheels 136, 138 of the luggage device 120. The handle assembly 140 includes a first portion 142 and a second portion 144. The second portion 144 is fixedly connected to an L-bracket 146 at a fixed pivot point 148 when the handle 140 is pulled to its greatest horizontal length extending from the luggage device 120. Attached to the L-bracket 146 is a locking wedge 147. Moreover, attached to pivot point 148 is a locking arm 151 which includes a cutout for receiving the locking wedge 147. Any conventional means is appropriate for defining the pivot point 148 and fixedly connecting the L-bracket 146 to the handle assembly 140 as well as for structure intended to work as a locking assembly as are the locking wedge and arm. For example, the locking wedge 147 can be replaced with a toggling button that alternatively engages and disengages locking arm 151.

Pivotably connected to the L-bracket 146 at pivot point 150 is an extension member 152 which is in turn connected to one of the pairs of second wheels 138 at axis 153. The extension member 152 is threaded through guide 154 which cooperates to accomplish the ejection/retraction and spatial orientation of the second wheel 138. The guide can form a ring surrounding the extension member and is fixed to the luggage device 120.

Figure 9:
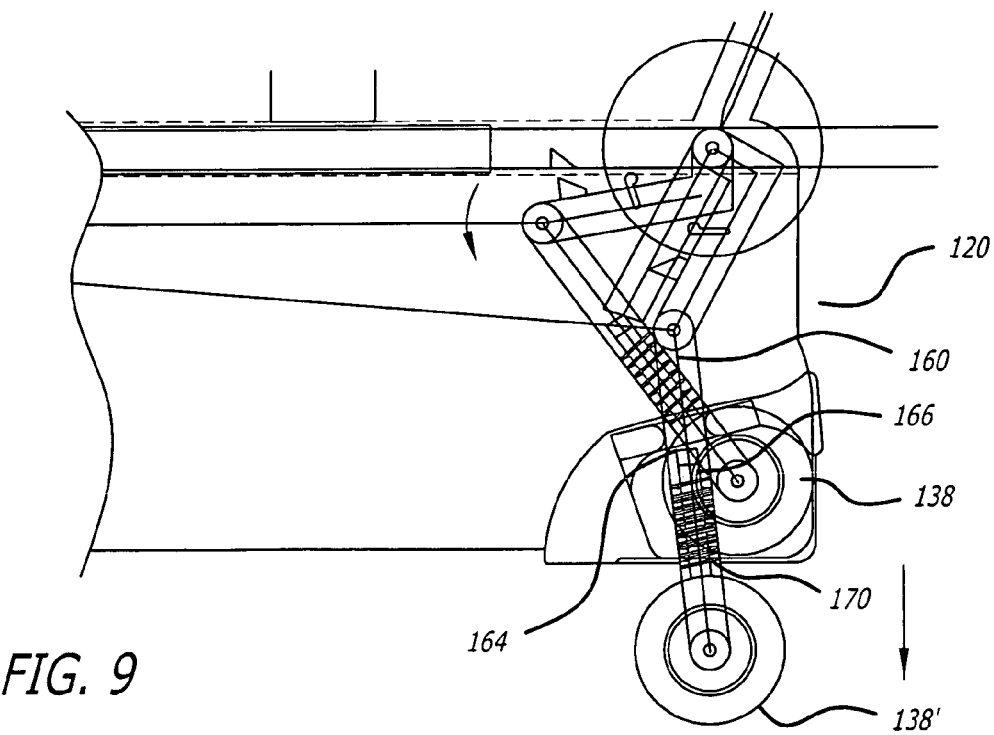
FIG. 9 is an enlarged view, depicting details of a braking system.

The handle assembly 140, bracket 146 and extension member 152 can be tubular or otherwise include a longitudinally extending internal space or slot for receiving therethrough a cable 160. At one end, the cable 160 is wrapped about a reel 162 positioned in the handle 140 and at a second end 164, the cable 160 is attached to a brake member 166 slidably configured within the extension member 152 (See also FIG. 9). The reel 162 in turn, is controlled by a second handle 168. One end of the brake member 166 is in direct engagement with a wheel 138 and the brake member 166 is biased by a spring 170.

The second set of wheels 138 are operatively connected to the first set of wheels 136 via a rod 180. A first end of the rod 180 is connected to pivot point 150 and at its other end to a first member 182 of a V-bracket assembly. The second member 184 of the V-bracket assembly is fixedly attached to the first member at point 186. Extending from the second member 184 of the V-bracket is an arm 190 which is pivotably connected to the second member at point 192. The arm 190 is threaded through a guide member 196 which facilitates the ejection and retraction of a wheel 136 connected to the arm 190 at axle 198.

To eject the wheels 136, 138, the handle 140 is first pulled to its full horizontal length and then rotated about point 148 to a position represented as 140' in FIG. 8. (It is to be noted that like reference numbers are identified with a prime symbol to represent relative positions after translational movement of a component.) Since it is locked to a fully extended handle 140, the L-bracket 146 follows the rotation of the handle from a horizontal position. The L-bracket 146 can then be locked into position 160' through the cooperation of locking wedge 147' and locking arm 151.

As the L-bracket is rotated to its locked position 146', the extension member 152 is pushed through guide 154 to position 152'. In doing so, wheels 138 are moved from a first retracted position to position 138' where the wheels are extended and positioned further from the long side of the body than when in the first retracted position as indicated by dimension "d" in FIG. 8.

Through this action, pivot 150 is translated to position 150', thereby rotating the V-shaped assembly 182, 184 via rod 180. As the V-shaped assembly is rotated about point 186, the arm 190 is advanced through guide 196 to cause the first wheels 136' to move from a retracted position to an ejected position 136' where the wheels are extended and positioned further from the long side of the body than when in the first retracted position. In order to retract the wheels 136, 138, the locking arrangement 146, 151 is released and the handle 140 is replaced to a horizontal position as shown in FIG. 8. The handle 140 can then be further retracted by sliding it along the top 124 of the luggage device along rails.

To rotationally unlock the second wheels 138, second handle 168 is activated. More specifically, handle 168 is placed in a vertical position or substantially in alignment with the handle 140 as shown in FIG. 8 (position 168'). By doing so, the cable 160 is wrapped about and simultaneously pulled toward point 162. Such action causes brake component 164 which is connected to the cable 160 to disengage from contact with wheel 138. To again apply the brake, the second handle 168 is pulled away from the handle 140. The spring 170 then aids in applying a force against the wheel 138.

A conventional child's car seat 210 can be attached directly to clamp 212 configured on a surface of the luggage device 120. Alternatively, as shown in FIGS. 4 and 5, support structure can be provided to project from the luggage device 120 to which a car seat can be connected or can further include webbing that forms an independent seat (For example, See FIG. 8).

Figure 10:
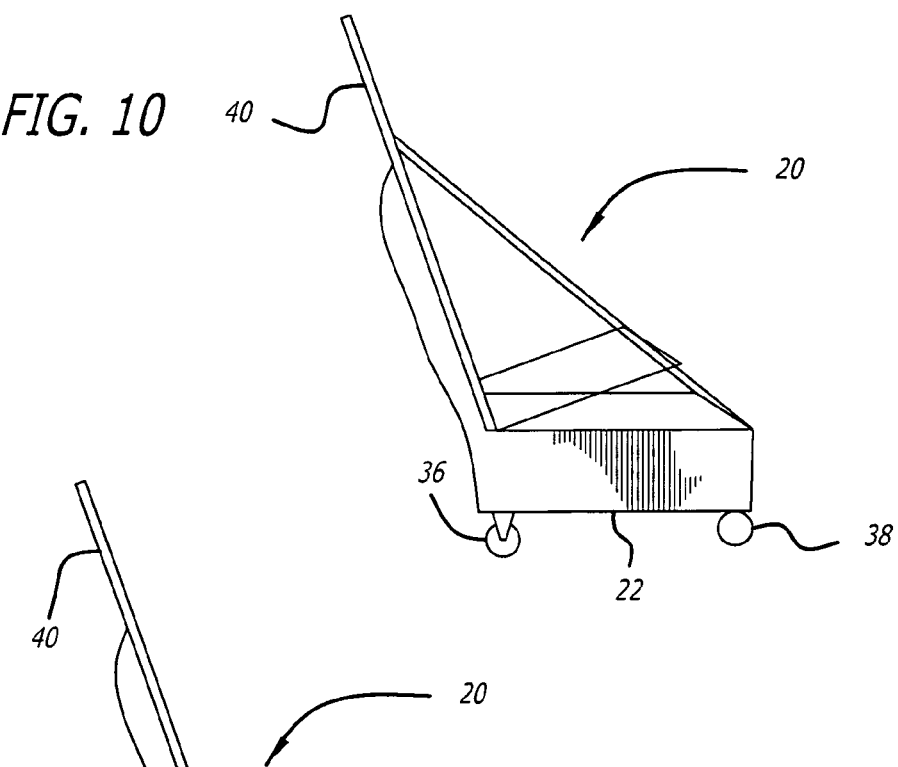
FIG. 10 is a perspective view, depicting one embodiment of the present invention.
Figure 11:
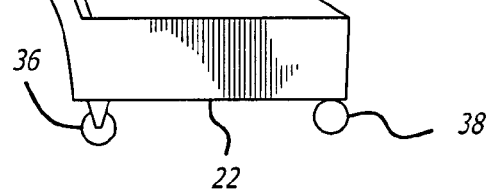
FIG. 11 is a perspective view, depicting another embodiment of the present invention.
Figure 12:
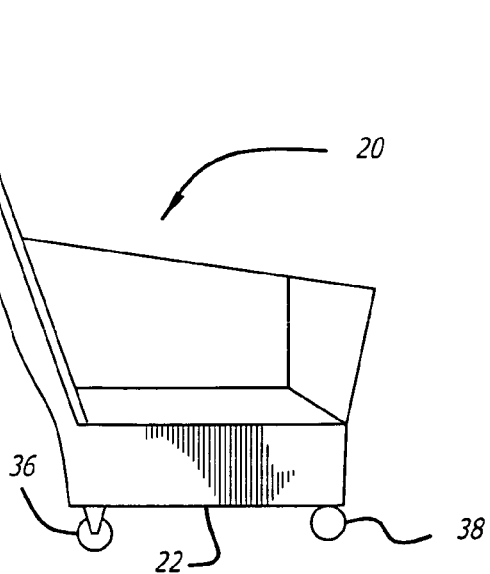
FIG. 12 is a perspective view, depicting yet another embodiment of the present invention.

As shown in FIGS. 10–12, various embodiments of luggage device of the present invention are contemplated. The luggage device 20 can be converted into a stroller with a storage compartment or a receptacle for a car seat (FIG. 10) or can simply convert into a pushable luggage device (FIG. 11). The device 20 can also include a basket 12 with a durable inner lining for receiving travel or other items. Due to its contemplated profile, the luggage device 20 of the present invention is also well suited for stacking.

The present invention provides a convenient luggage device that can be pushed or pulled in vertical or horizontal positions and which is convertible into various forms. One easy pulling motion on the handle assembly of the luggage device of the present invention accomplishes the extension of the wheels as well as the locking of at least one wheel of the device and the deployment of the convertible portion thereof. A simple second compression force applied to the brake handle releases the lock on the wheels and the luggage device is ready for use.

It will be apparent from the foregoing that, while particular forms of the invention have been illustrated and described, various modifications can be made without departing from the spirit and scope of the invention. Accordingly, it is not intended that the invention be limited, except as by the appended claims. While the specification describes particular embodiments of the present invention, those of ordinary skill can devise variations of the present invention without departing from the inventive concept

I claim:

1. A convertible luggage device for transportation of items along a transportation surface, comprising:
    a main body having a long side and at least one short side, the main body including a compartment for storage, the compartment being capable of being opened and closed to retain items within the compartment;
    a handle and means for connecting the handle to the main body; and
    a first pair of wheels and a second pair of wheels and means for mounting the first pair of wheels to the main body for providing the first pair of wheels with, a first retracted position wherein the first pair of wheels include a portion which extends beyond both the long side and the at least one short side of the main body such that the luggage device can be rolled across a transportation surface with the long side being substantially vertical to the transportation surface and a second extended position wherein the first pair of wheels is extended and positioned further from the long side of the body than when in the first position;
    wherein the luggage device accomplishes storing and retaining items in the compartment when the long side of the luggage device is rolled along the transportation surface.

2. A convertible luggage device of claim 1, wherein the first pair of wheels are retractable and ejectable and activation of the handle accomplishes retraction and ejection of the first pair of wheels.

3. A convertible luggage device of claim 1, the handle further including a brake system.

4. A convertible luggage device of claim 3, wherein, the brake system operates to control rotation of at least one of the second pair of wheels.

5. A convertible luggage device of claim 4, the brake system further including a cable attached to a pulley configured within a tube defining the handle.

6. A convertible luggage device of claim 5, the brake system further including a compression brake arrangement that cooperates with the pulley and cable.

7. A convertible luggage device of claim 6, the brake system further including a brake handle operatively connected to the brake cable, activation of the brake handle accomplishing deactivation of the brake.

8. A convertible luggage device of claim 1, further comprising a basket assembly connected to the long side of the main body.

9. A convertible luggage device of claim 8, the basket assembly defining a generally rectangular space with an open top.

10. A convertible luggage device of claim 9, the basket assembly having walls defined by netting.

11. A convertible luggage device of claim 1, further comprising a strapping system for engaging a child car safety seat.

12. A convertible luggage device of claim 1, further comprising a first zipper accessible compartment that provides access to an interior of the main body.

13. A convertible luggage device of claim 12, further comprising a second zipper accessible compartment that is configured to receive convertible structure of the luggage device.

14. A convertible luggage device of claim 1, wherein the handle includes structure that automatically locks at least one wheel when the handle assembly is pivoted into a first position.

15. A convertible luggage device of claim 1, further comprising a force activated compression brake.

16. The convertible luggage device of claim 1, wherein at least one wheel of the first pair of wheels includes a second portion which overlaps or is contained within boundaries defined by the long side and the at least one short side when the first pair of wheels are in the first retracted position.

17. The convertible luggage device of claim 1, further comprising means for mounting the second pair of wheels to the main body for providing the second pair of wheels with a fully retracted position and an ejected position, wherein the handle is pivotably connected to the main body and operatively connected to the first pair of wheels and second pair of wheels such that activation of the handle causes the first pair of wheels to move from the first retracted position to the second extended position and causes the second pair of wheels to move from the fully retracted position to the ejected position.

18. The convertible luggage device of claim 17, wherein when the first pair of wheels are in the second extended position and the second pair of wheels are in the ejected position, the luggage device can be rolled on the first and second pairs of wheels with the long side parallel to the transportation surface.

19. The convertible luggage device of claim 18, further comprising a pivot point, an L-shaped bracket rigidly connected to the handle and including a locking wedge projecting therefrom, and a rotating arm including a mating structure for receiving the locking wedge, the L-shaped bracket and rotating arm being rotatably connected to the pivot point.

20. The convertible luggage device of claim 19, further comprising:
    a guide member fixed to the main body; and
    a tubular extension member including a first end pivotably connected to the L-shaped bracket and a second end portion housing a spring biased brake member, translation of the tubular extension member being controlled by the guide member.

* * * * *